Figure 1:
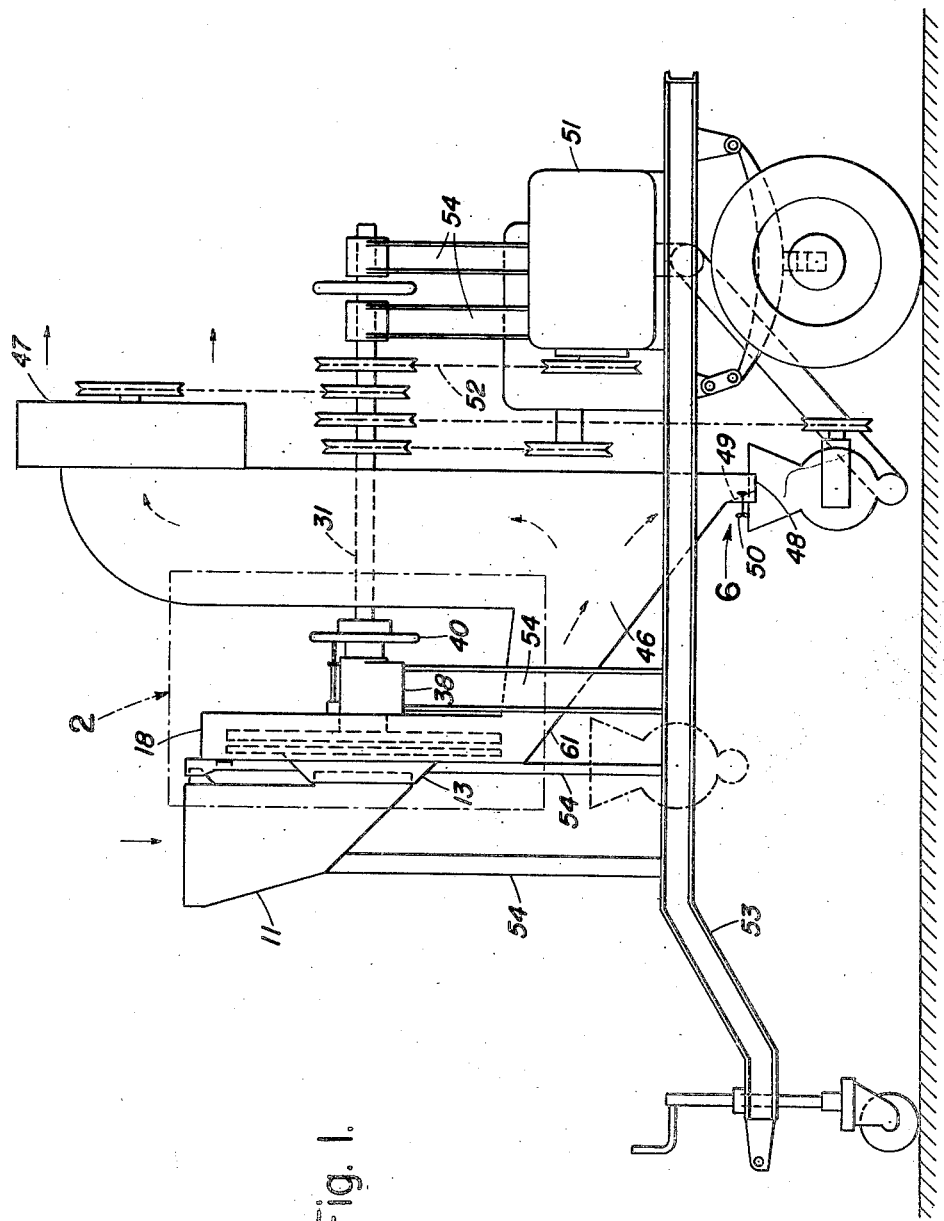

Dec. 15, 1953  E. F. HANSEN  2,662,570
HULLING MACHINE HAVING RUBBER HULLING
SURFACES OF DIFFERENT HARDNESS
Filed March 9, 1953  4 Sheets-Sheet 1

INVENTOR
Edward Frank Hansen
BY Willard R. Sprowls
AGENT

Dec. 15, 1953  E. F. HANSEN  2,662,570
HULLING MACHINE HAVING RUBBER HULLING
SURFACES OF DIFFERENT HARDNESS
Filed March 9, 1953  4 Sheets-Sheet 3

INVENTOR
Edward Frank Hansen
BY Willard R. Sprowls
AGENT

Patented Dec. 15, 1953

2,662,570

UNITED STATES PATENT OFFICE 2,662,570

HULLING MACHINE HAVING RUBBER HULLING SURFACES OF DIFFERENT HARDNESS

Edward Frank Hansen, Stanton, N. J., assignor to The Baker Castor Oil Company, Jersey City, N. J., a corporation of New Jersey Application March 9, 1953, Serial No. 341,009

10 Claims. (Cl. 146—299)

This invention relates to improvements in machines for the decortication, hulling, shelling, and threshing of seeds and nuts. While the invention is discussed below primarily in terms of the decortication, hulling, shelling, and threshing of castor beans, it is to be understood that the improvements of this invention are also applicable to similar treatment of other seeds and nuts, such as peanuts, almonds, and similar seeds and nuts. This is a continuation-in-part of my application Serial No. 190,183, filed October 14, 1950, now abandoned.

In addition to the specified seeds and nuts, this invention is also applicable to all natural products from which there must be removed and separated a covering, hull, pod, shell, or seed coat which can be broken sufficiently by a combined rubbing and rolling action to permit removal of said covering, hull, pod, shell, or seed coat from its contents which are fragile, oily, or both fragile and oily without damaging said contents. In this connection, it should be pointed out that the term "hulling," as used in this specification, is meant to apply to the act of stripping off the bark, rind, hull or outer coat from the indicated types of natural products, and includes such operations as decortication, shelling, and threshing.

Machines are currently known for the hulling of castor beans and the like in which the hulling surfaces are coated with rubber. One such huller is described in "Agricultural Engineering," 24, June 1943, and 25, August 1944. This machine employs a rotating cylinder operating at an adjustable distance from a stationary concave. In order to obtain a good yield of clean, unbroken beans, it is important to be able to maintain an accurate adjustment clearance between the hulling surfaces. It is both difficult and time-consuming to make the clearance adjustment required on a cylinder huller.

Another huller is described in Bulletins Number 179 and 187 issued by the Agricultural Experiment Station, University of Tennessee, Knoxville, Tennessee. This machine hulls castor beans by feeding the beans into the space between two opposed rubber-faced discs, one of which is stationary and one of which rotates. This machine is designed to operate on dried beans, but an economic advantage would result if the step of drying wet beans could be eliminated. With this machine, no acceptable hulling is possible unless freshly harvested beans have been dried at an elevated temperature for from 3 to 6 hours, or unless the beans have been subjected to long periods of storage.

This problem of hulling moist beans is becoming more important with the present advent of mechanical harvesters. Such mechanical harvesters are not sufficiently selective, and, as a result, the harvested beans will include a greatly increased percentage of moist beans-in-hull.

It is an object of this invention to provide a machine which is capable of hulling seeds and nuts. It is a further object of this invention to provide a machine which is capable of effectively hulling seeds and nuts which have not been subjected to a drying step. Another object of this invention is to provide a hulling machine having increased capacity with minimum breakage and maximum hulling. Additional objects will be apparent from the following description of the invention.

These objects are accomplished and the hulling of seeds and nuts, e. g., castor beans, is rendered more efficient and effective by the provision of opposed hulling surfaces which are characterized by having the rubber facing on one surface of a substantially different hardness from the hardness of the rubber facing on the other surface. It has not been known in the past to use rubber of different hardnesses on the hulling surfaces of a hulling machine. It has been found that the use of rubber facings having the same hardness on the hulling surfaces of a hulling machine, as in the prior art devices, creates the need for special pre-treatment of the moist seeds and nuts in order to obtain satisfactory hulling results. This invention (differential hardness of the rubber facings) is not dependent on the shape of the hulling surfaces, and is applicable to hullers in which the hulling surfaces are cylindrical, cone-shaped, or flat discs, as well as to other types of hullers which are not mentioned herein.

The exact basis for the effect produced by differential hardness of the rubber facings is not known. When both of the rubber hulling surfaces are composed of soft rubber, poor hulling results, as evidenced by the large amounts of unhulled and/or cracked and broken beans in the effluent from the hulling area; when both of the surfaces are composed of hard rubber, large amounts of the seeds being hulled are cracked. However, when rubbers of different hardnesses are used simultaneously as the hulling surfaces, the hulling efficiency is increased, enabling more beans to be hulled with less breakage.

Also, and quite significantly, the use of rubber hulling surfaces with different hardnesses enables the complete elimination of the pre-drying of beans, seeds, and nuts, such as has been an essential feature of operations with prior art hulling equipment. The hulling equipment of this invention can be used satisfactorily for the hulling of moist beans and capsules that are green and succulent. Thus, for example, castor beans grown in Oklahoma or Texas frequently have a moisture content as high as 12–15% after harvesting. Such beans can be immediately and effectively hulled by means of the equipment of this invention. This type of treatment of harvested castor and other beans has not heretofore been possible. This is of the greatest importance since, when beans, etc. are artificially dried, the beans, etc. become much more fragile. As it is frequently necessary to transport and otherwise subject the hulled beans to rough handling before they are processed for the recovery of their oil content, it is obviously desirable to keep the moisture content of the beans, etc. at a relatively high level, so that the beans, etc. are not broken prior to the time at which it is desired to recover the oil therefrom. The adverse effects of breaking the seed coats prior to oil recovery are described below.

It has been found that, for the purposes of of this invention, the Shore A hardness of the harder facing is in the range from about 40 to about 70; a preferable upper limit for this hardness range is about 60. The Shore A hardness of the softer rubber facing suitably ranges from about 15 to about 45, the preferable lower limit being about 25 and the preferable upper limit being about 40. It should be noted that the hardness of the harder rubber facing may be less than about 40, but the hardness of the softer facing should not be greater than about 45. Also, an important feature of this invention is that the difference between the Shore A hardnesses of the two rubber facings should not be less than about 10; a preferred range for this difference is from about 10 to about 20.

The procedure for determining the Shore A hardness of a rubber stock is that recommended by the American Society for Testing Materials under its designation D676–47T. Further information on this test method is given at pages 404–410 of the ninth edition (1948) of "The Vanderbilt Rubber Handbook." Incidentally, some prior art patents on the hulling of grains, a subject not included within the scope of this invention, disclose the use of opposed rubber and stone hulling surfaces, and of opposed rubber and abrading material (layer of cement, emery, or carborundum) hulling surfaces. Such stone and abrading material surfaces are non-elastic, and completely outside of the scope of the Shore hardness test; since the maximum desirable Shore A hardness for the purposes of this invention is about 70, such non-elastic surfaces are extremely unsuitable alternatives to the use of the harder rubber facing of this invention. A prior art patent on the husking of corn, also a subject not included within the scope of this invention, shows the use of grooved rubber rolls with differential yielding properties, said rolls rotating at the same speed so that the grooves and ribs can mesh properly. The husks pass between the rolls, while the ears of corn do not. The purpose of the differential yielding properties of the rolls is to afford maximum gripping of the husks, an effect which is not desirable in the instant invention. Also, the present invention calls for passage of the entire unhulled seeds into the space between the rubber facings, and the latter rotate at relatively different speeds.

In practice, it has been found satisfactory to bond the rubber facings to the discs by means of commercially available rubber cements. Superior and more durable rubber facings may be prepared by curing the rubber to the metal disc in, e. g., a tire retreading machine. In addition, a metal retaining ring is employed at the inner diameter of the rubber facings. This retaining ring holds the beveled edge of the rubber facing to the hulling disc, and also prevents the lifting of the facing from the disc by means of dust, hulls, beans, or foreign material.

As regards the rubbers suitable for use as hulling surfaces according to this invention, any of the natural or synthetic rubbers having hardness in the required ranges may be used with good results. Among the suitable synthetic rubbers are the copolymers of butadiene and acrylonitrile or styrene, chloroprene polymers, copolymers of chloroprene and isoprene or acrylonitrile, copolymers of isobutylene and butadiene or isoprene, organic polysulfides, polyesters, silicones, and the like.

While this invention is applicable to cylindrical, cone, and disc hullers, the disc huller is the preferred hulling machine because, in this equipment, it is possible to maintain closer control over the clearance between the hulling surfaces. It is in conjunction with the use of the disc huller, the discs being mounted in a vertical position, that a desirable operating feature, namely, a centrifugal cone feed, comes into play. By the use of this type of feed device, it is possible to distribute the beans uniformly between the hulling surfaces and, thus, obtain more efficient use of the machine.

An advantage of the centrifugal cone feed is that, when it is used in conjunction with the disc huller, increased hulling capacity is achieved. The factors contributing to this result are: the material to be hulled is introduced uniformly around the circumferential edge of the feeding hole in the stationary disc; the material to be hulled is forced into the gap between the discs where it may be engaged by the rubber surfaces; since the material to be hulled is introduced uniformly over the entire hulling surfaces, the wear on the stationary disc is uniform, rather than mostly at the bottom as in previous hulling machines. Where the material to be hulled is fed to the disc gap by gravity, as in previous hulling machines, the material feeds best at the bottom of the gap, and progressively more poorly around the circle in the direction of rotation of the rotating disc. When spiny capsules are encountered, as in the case of castor beans, they tend to interlock and bridge in the feed hopper, and thus stop the flow of seeds to the hulling gap. The vibration of the centrifugal cone is sufficient to prevent bridging in the feed hopper. Also, the centrifugal cone is able to take material, present in bulk in the hopper, and distribute it in a shallow flow uniformly about the feed hole.

When a centrifugal cone feed is not used, there is considerable churning of the material in the feed hopper adjacent to the hulling gap. As the capsules approach the hulling gap, many are thrown back to the hopper before they can become engaged by the hulling surfaces. Thus, even that portion of the hulling gap normally fed by gravity feed devices is not charged up to its capacity. When a centrifugal cone feed is used, the capsules are directed into the hulling gap with more force (than in the case of the gravity feed), and, as a result, there is little or no tendency for rejection of the capsules at the hulling gap. Consequently, the centrifugal cone feed permits the uniform charging of capsules to the hulling gap at or close to the capacity of the hulling surfaces. An indication of the effectiveness of the centrifugal cone feed in the case of castor beans having a 7% moisture content is that, when using hulling discs having an outside diameter of 36 inches, 8000 pounds of such beans could be hulled per hour. When, under the same circumstances, the centrifugal cone feed was replaced by a gravity feed, the rate at which the beans could be hulled dropped to 3500 pounds per hour, or less than one-half of the rate achieved by using the cone feed.

The problem of getting material into the hulling gap can be understood more readily when the physical dimensions of the capsule and gap are considered. In the case of the Conner variety of castor beans, the most effective hulling, under normal conditions, occurs with a gap ranging in width from about 0.41 to about 0.43 inch. Castor bean capsules are generally spherical in shape, and have a diameter ranging from about 0.60 to about 0.65 inch. The difficulties of gravity feeding under such circumstances are quite obvious. In general, when using hulling surfaces having a differential hardness as per this invention, the size of the hulling gap is less than the average length of and greater than the average width of hull-free beans, seeds, or nuts. On the contrary, when equally and moderately hard rubber hulling surfaces are used, the distance between the surfaces must be the same as or somewhat more than the length of a hull-free seed or bean. This observation is indicative of the critical nature of the distance between the hulling surfaces.

An important factor in connection with the feeding of material into the hulling gap is the angle formed by the inner edge of the rubber facings with the plane of the hulling discs. When this angle is 90°, the rate at which material can be fed into the hulling gap is completely unsatisfactory. When this angle is reduced to 45°, there is still considerable churning of the material to be hulled. However, when the angle is reduced to from about 20° to about 30°, the material flows into the hulling gap quite readily, and the hulling rate is increased to a satisfactory extent. This statement must be qualified to the extent that the thickness of at least one of the rubber facings must be great enough so that, when the hulling gap is adjusted for the most efficient hulling, the unhulled bean capsules can conveniently fit into the space between the beveled surface of one facing and the surface of the other facing, and then can readily pass into the hulling gap, this action being promoted by the gradually increasing grip on the capsules. Thus, for example, in the case of castor beans, the combination of a ⅜ inch facing and a beveled ¾ inch facing has been found to give excellent feeding results, while, when both facings are ⅜ inch thick, the bevel contributes little toward improving the feed rate to the hulling gap; i. e., when the entry gap is adjusted for a desirable feed rate, the hulling gap is too great for effective hulling.

The diameter of the discharge (larger) end of the cone may be the same as or smaller than the feed opening in the stationary rubber-faced disc. However, it is preferable that this diameter be the same as that of the feed opening, so that the discharge end of the cone will be flush with the edge of the beveled rubber facing on the rotating disc.

The speed of rotation of the centrifugal cone feed may be adjusted to any suitable rate. This rate may be the same, less, or greater than the speed of rotation of the rotating rubber-faced disc. Thus, the centrifugal cone feed may be attached directly or indirectly to the shaft on which the rotating disc assembly is mounted, or may have its own separate shaft and drive mechanism.

In special cases, the center of the opening in the stationary rubber-faced disc may be offset from the center of the disc. However, since it is usually desired that the feed be uniform to all sectors of the rubber-faced discs, the main reason for offsetting the center of the feed opening would be to overcome the force of gravity on heavier seeds and nuts. Also, the opening in the stationary rubber-faced disc may be a sector or other portion of a circle, or may be any other shape which will enable the feeding of the material to be hulled uniformly and at the desired rate.

A factor which is important in obtaining effective hulling is the difference between the inner and outer diameters of the opposed rubber hulling discs. This difference preferably remains substantially constant within a small range, regardless of the outer diameter of the hulling disc. Thus, the capacity of the huller can be increased by increasing the outer diameter of the rubber hulling discs, but cannot be increased by increasing the width of the rubber facings for the discs (this width is equal to the difference between the outer radius and the inner radius of the rubber facings). In fact, it has been found that, when using rubber hulling discs with a given outer diameter, the hulling capacity decreases as the width of the rubber facings increases (that is, as the diameter of the feeding hole in the stationary disc decreases). Thus, the width of the rubber facings should be no greater than necessary to secure effective hulling of the beans. Also, when the rubber facings are wider than the optimum, the hulled beans tend to be injured before they are discharged from the hulling gap. In practice, a suitable width for the rubber facings is in the range from about 1.5 to about 6.0 inches.

It should be noted that, other things being equal, a profound improvement in hulling capacity is effected by the use of the huller facings of this invention, as contrasted to prior facings of equal hardness. Data on this point are presented in and discussed in connection with Table IV below, the reported results having been obtained on a disc-type huller with the discs mounted in a horizontal position. Incidentally, it will be understood that, when the discs are mounted in this position, the need for using the centrifugal cone feed referred to above is eliminated.

In Figure 1, the main features of one type of hulling machine, i. e., the vertical disc huller are shown. Seeds and nuts are fed into the hopper 11, from which they proceed via a feed inlet such as centrifugal cone feed 13, into the space between the hulling discs (shown diagrammatically), which are mounted in the housing 18. The hulls and clean seeds drop down into the chute 61, and proceed to the air separator 46. This separator is of the Y-type, and is characterized by having the air inlet 48 greatly constricted as compared to the air outlet at suction fan 47. The exact adjustment of the diameter of air inlet 48 so that a clean separation of hulls and seeds is obtained, the hulls proceeding upward and out via the suction fan 47 and the clean seeds falling through air inlet 48, e. g., to a conveyor leading to a storage container, can be effected by means of hinged flap 49 and the wing nut 50 which controls the position of flap 49. The flow of air through separator 46 can suitably be effected by means of suction fan 47. The hinged flap feature is optional, as the beans and hulls can be cleanly separated by proper pre-determination of the dimensions of the separator 46 and by appropriate control of the suction fan rate. The rotating disc is attached to shaft 31. The power for this shaft is furnished by engine 51 via pulley 52. Suction fan 47 can also be operated from shaft 31. The hulling machine can suitably be mounted on a frame 53, having vertical supporting members 54, so that the whole is portable.

Figure 2:
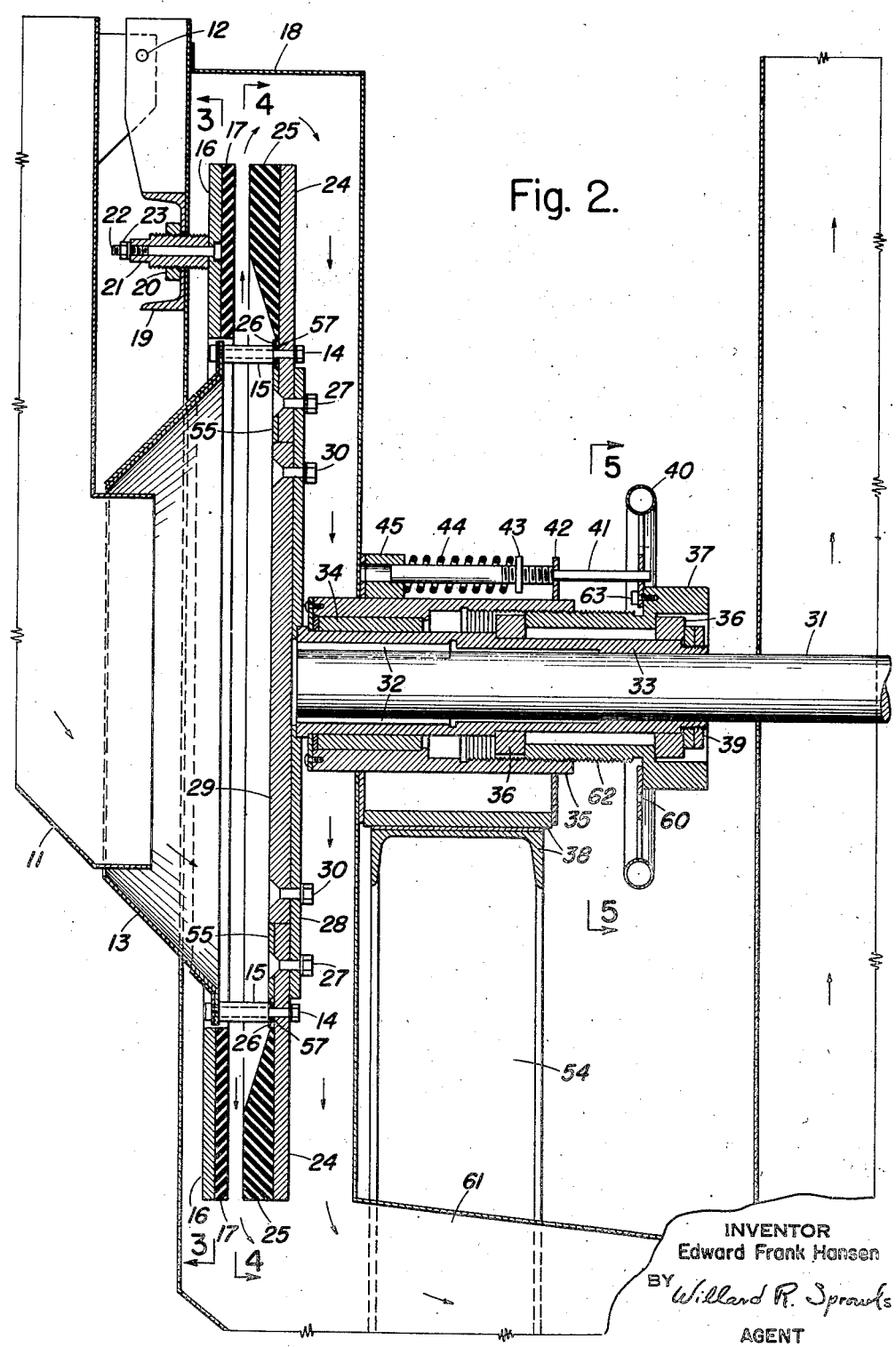

Figure 2 shows details of a portion of the hulling machine mechanism. As shown in this figure, feed hopper 11 is attached to the machine frame by means of bolt 12. The centrifugal cone 13 extends through housing 18, and is attached to rotating disc 24 by means of bolts 14 and spacers 15. The larger end of the feed cone 13 is adjacent to the fixed disc 16, to which is attached the hard rubber facing 17. The exact position of the fixed disc 16 can be adjusted by means of three levelling pins, the details of one of which are shown in this figure, and are pointed up by the following description. An angle iron 19 is positioned around a hole in housing 18. To this angle iron is welded a threaded steel plate 20. Through this plate is passed an externally threaded steel bar 21 with a squared head, the inner end of this bar pressing against fixed disc 16. Through steel bar 21 passes a bolt 22, having its head set in a depression in fixed disc 16. This bolt is maintained in position by means of castle nut 23 and appropriate washers.

Figure 4:
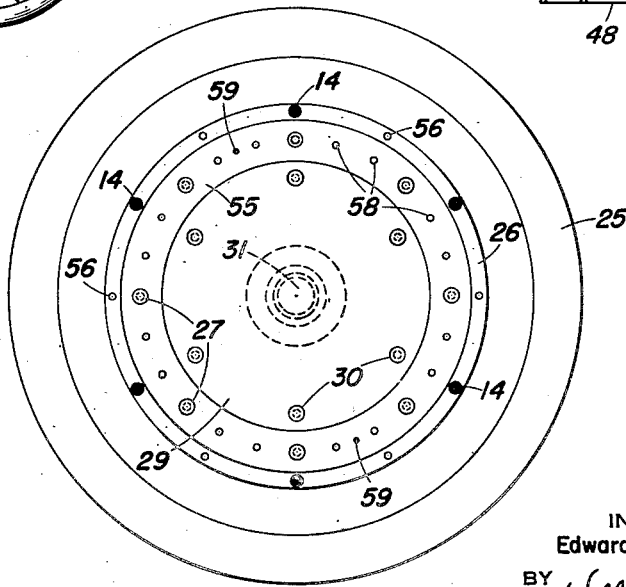

The shaft 31, as well as main sleeve 33, fit snugly into a hole in drive disc 28. To this drive disc is fixed a plate 29 by means of bolts 30. The rotating disc 24, carrying the beveled soft rubber facing 25, is attached to drive disc 28 by means of bolts 27. Rubber retaining ring 26, which holds the inner edge of the beveled soft rubber facing in place, is attached to the rotating disc by means of bolts 56 (Fig. 4); a metal ring 57 is sandwiched between the rotating disc and retaining ring 26, this ring 57 being riveted to rotating disc 24. The spacer ring 55 is riveted to rotating disc 24 by means of rivets 58 (Fig. 4).

Thus, when the hulling machine is in operation, the seeds or nuts are transferred via feed cone 13 through the opening in fixed disc 16 into the space between the opposed hulling surfaces 17 and 25. The distance between these hulling surfaces has been found to be very critical. If the hulling surfaces are too far apart, the percentage of unhulled capsules and segments is unsatisfactorily high. If the hulling surfaces are too close together, the hulling is more complete but the percentage of broken beans is too great to be tolerated. The correct spacing between the hulling surfaces depends upon the size of the seeds or nuts which are being hulled. The optimum distance between these surfaces is attained for seeds and nuts of any particular size when the percentage of unhulled material is the same as the percentage of broken seeds; in the case of the disc huller of Figure 1, this percentage has been found to be, in general, in the range of less than about 4% for each of these values. When the distance between the hulling discs is increased from the optimum distance by 0.020 inch, the percentage of broken seed decreases approximately 1%, but the amount of unhulled material increases as much as 5%. When the spacing is decreased by 0.020 inch from the optimum setting, the percentage of broken seed increases several percent, without any appreciable reduction in the amount of unhulled segments.

In view of these facts, a desirable form of huller embodying the improvements of this invention has been designed so that the distance between the hulling surfaces can be adjusted to reproducible settings in increments of 0.01 inch. A useful feature is that the clearance between the hulling surfaces can be adjusted while the huller is in operation.

The details of the mechanism for adjusting the hulling gap are also shown in Figure 2. As indicated above, shaft 31 and main sleeve 33 are fixed firmly into drive disc 28. The shaft is locked to the main sleeve by means of key 32. Thus, movement of the shaft axially through its supporting bearing 34 will effect variations in the hulling gap.

The mechanism for controlling this adjustment within extremely narrow limits is shown in detail. A bushing 37 is mounted on shaft 31, and held in place by an externally threaded collar 62 and thrust bearings 36 at each end of the collar. This assembly is held in position by check nut 39. This arrangement permits the shaft to rotate freely within the bushing, but does not permit the shaft to be displaced axially unless the bushing is displaced a like amount. The bushing collar has a screw thread which engages a mating thread in a fixed support 35, which is attached to fixed support members 38. A hand-wheel 40 is attached to bushing 37 so that, when the hand-wheel is turned, the bushing moves in or out of the fixed support 35, the shaft assembly moving with the bushing. As an example, when the bushing has a screw thread pitch of ten threads per inch, one rotation of the hand-wheel will displace the bushing and shaft assembly by 0.100 inch. If, in this example, the hand-wheel has ten holes equally spaced about its rim, it is a simple matter to control the rotation of the hand-wheel in increments of 36° (one-tenth of a circle). Thus, when the hand-wheel is rotated 36°, the shaft assembly is displaced axially by 0.01 inch.

A satisfactory means for locking hand-wheel 40 in any desired position involves mounting on fixed support 35 a spring-loaded indexing pin 41 in such a manner that it can engage one of the holes 60 near the rim of hand-wheel 40. Indexing pin 41 moves through a hole in support 42, and carries a head 43 which can readily be grasped for movement of the pin. The indexing pin is held in position in one of the holes 60 by means of spring 44 and backing member 45.

Figure 3:
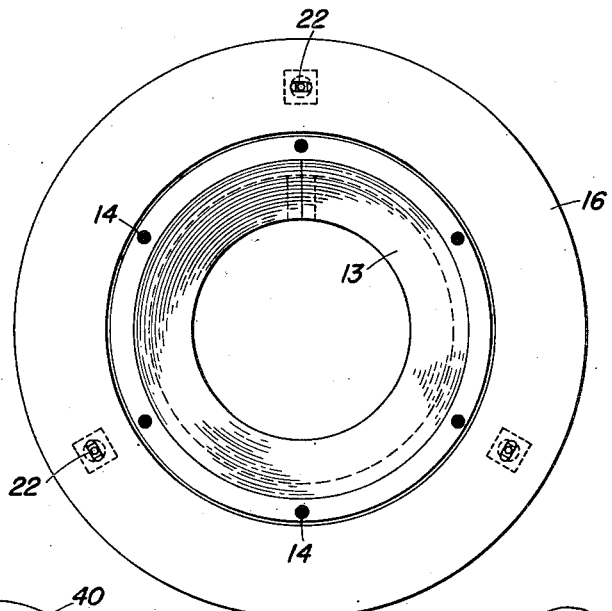
Figure 5:
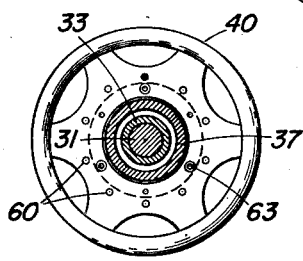
Figure 6:
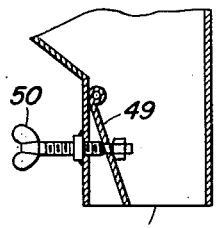

Figure 3 is a cross section on line 3—3 of Figure 2, showing the fixed disc and the feed cone. Figure 4 is a cross section on line 4—4 of Figure 2, showing the rotating disc and the plate which is mounted on the drive disc. As per this figure, the connection between spacer ring 55 and rotating disc 24 is by means of rivets 58. Dowel pins 59, which connect spacer ring 55 to drive disc 28, serve as a positioning means for correctly mounting the rotating disc on the drive disc. Figure 5 is a cross section on line 5—5 of Figure 2, showing the shaft and hand-wheel assembly. Bolts 63 are used for connecting hand-wheel 40 to bushing 37. Figure 6 shows the details of the device for controlling the diameter of air inlet 48.

It is to be understood that, while in the drawings of this invention the axis of the centrifugal cone feed and the rotating rubber-faced disc is horizontal, it is also feasible to construct equipment embodying the principles of this invention in which this axis is in a vertical or an inclined position.

As regards the Y separator, it has been found that it is desirable to operate this portion of a hulling machine under atmospheric or sub-atmospheric pressures. When the pressure in the separator is increased above atmospheric pressure, it becomes increasingly difficult as the pressure rises to adjust the diameter of the air inlet opening 48 so as to effect good separation of the hulls from the clean seeds.

Suitable air velocities in the separating chamber when castor beans are being hulled range from about 2,000 to about 2,800 feet per minute. Adjustments of the air velocity can be effected by variation in the speed of the suction fan and/or by alteration in the position of the hinged flap 48. As already indicated, appropriate adjustment of the air velocity in the separating chamber makes it readily possible to effect a clean separation of sound kernels from shells and chaff. While the most suitable air velocity will vary from one seed type to another, suitable adjustment of the variables (fan speed, fan discharge, and size of air inlet) will lead to the desired recovery of clean, sound kernels.

It is undesirable that the seed coats be broken during the hulling operation, unless the oil is to be separated from the seed almost immediately. For example, in the case of castor beans, when the seed coats are broken, the enzyme, namely, lipase, contained in the beans begins its hydrolytic action on the glycerides present in the beans. When broken and damaged beans are treated for the recovery of the oil content after storage of such beans, the resulting oil has undesirably high color and free fatty acid content. The improvements of this invention permit the processing of oil-bearing seeds and nuts with greatly reduced damage to the seed coats (as compared to prior art devices), and also reduce the amount of hulls remaining with the beans. The presence of hulls with the hulled beans causes a decrease yield of oil during the pressing operation, as well as an objectionable increase in the color of the oil subsequently extracted from the press cake. Such presence of hulls also causes an undesirable loss of oil in solvent extraction operations.

Data are presented below which show the desirable hulling results attainable by means of the equipment of the instant invention, as well as the effects of changes in the operating variables. Also, comparative data are given on the equipment of the instant invention and that identified above as being developed at the University of Tennessee.

The data given in Tables I–III for the equipment of the present invention were obtained with hulling discs having an outside diameter of 24 inches, and with a rotating disc moving at a rate of 425 R. P. M. This latter figure is significant, in that the percentage of broken beans increased as the speed of rotation was increased to 500 R. P. M. (the rate of hulling also increased). As the speed of rotation was decreased, the percentage of broken beans also increased, primarily because a smaller hulling gap was required to obtain effective hulling. For the indicated 24 inch rotating disc, a suitable range of speed of rotation is from about 410 to about 465 R. P. M. This optimum speed range will vary with the size of the hulling discs, and with the nature of the beans or seeds being hulled. In all cases, the thickness of the stationary disc facing was ⅜ inch, while that of the rotating disc facing was ¾ inch; the width of the facings was 3 inches.

TABLE I

*Effect of variation in hulling gap—Conner variety of castor beans*

| Hulling Gap, Inches | Moisture, Percent | Rubber Hardness, Shore A | | Unhulled Beans, Percent | Broken Beans, Percent |
| --- | --- | --- | --- | --- | --- |
| | | Stationary Disc | Rotating Disc | | |
| .380 | 5.0 | 55 | 15 | 9.8 | 2.6 |
| .370 | 5.0 | 55 | 15 | 8.0 | 1.2 |
| .350 | 5.0 | 55 | 15 | 9.9 | 0.9 |
| .320 | 5.0 | 55 | 15 | 6.5 | 1.1 |
| .300 | 5.0 | 55 | 15 | 3.0 | 1.2 |

It is to be noted that a small change (0.02–0.03 inch) in the size of the hulling gap produces a significant change (3.5%) in the amount of unhulled beans present in the product of the hulling equipment of this invention. Also, the product formed with a hulling gap of 0.300 inch contains 95.8% of clean, unbroken beans. This notable result was obtained when operating with rubber discs having a difference of 40 in their Shore A hardnesses, and with beans having a moisture content of 5.0%.

TABLE II

*Effect of variation in moisture—Conner variety of castor beans*

| Moisture, Percent | Hulling Gap, Inches | Rubber Hardness, Shore A | | Unhulled Beans, Percent | Broken Beans, Percent |
| --- | --- | --- | --- | --- | --- |
| | | Stationary Disc | Rotating Disc | | |
| 5.0 | .300 | 55 | 15 | 3.0 | 1.2 |
| 20.0 | .300 | 55 | 15 | 8.9 | 2.1 |
| 10.0 | .400 | 55 | 35 | 5.3 | 6.3 |
| 18.5 | .400 | 55 | 35 | 5.9 | 7.1 |
| 7.0 | .300 | 25 | 15 | 1.6 | 2.7 |
| 11.5 | .300 | 25 | 15 | 5.3 | 1.6 |
| 5.0 | .410 | 35 | 15 | 1.6 | 4.0 |
| 7.0 | .410 | 35 | 15 | 1.6 | 3.5 |

It is surprising that reasonably good hulling results are secured when operating with beans having a 20.0% moisture content; in this case, the product from the equipment of this invention contains 89.0% of clean, unbroken beans. The data of Table II also indicate that advantageous results are secured with beans having intermediate moisture contents.

TABLE III

*Comparison of hulling castor beans (Conner variety) with huller of this invention and with the huller referred to above as being developed at the University of Tennessee.*

| Huller | Rubber Hardness, Shore A | | Hulling Gap, Inches | Moisture, Percent | Un-hulled Beans, Percent | Broken Beans, Percent |
|---|---|---|---|---|---|---|
| | Stationary Disc | Rotating Disc | | | | |
| Hansen | 35 | 15 | .410 | 5.0 | 1.6 | 4.0 |
| | 35 | 15 | .430 | 5.0 | 2.0 | 2.0 |
| | 35 | 15 | .410 | 7.0 | 1.6 | 3.5 |
| | 55 | 35 | .420 | 7.0 | 3.4 | 1.8 |
| | 55 | 35 | .420 | 18.5 | 13.6 | 5.0 |
| Tennessee | 55 | 55 | .420 | 5.0 | 5.8 | 4.4 |
| | 55 | 55 | .420 | 15.0 | 26.8 | 2.6 |
| | 55 | 55 | .420 | 18.0 | 79.7 | 0.2 |

These data (Table III) were obtained on a strictly comparable basis. On both machines, hulling discs having an outside diameter of 24 inches were used, and the R. P. M. were the same. The plant material was identical, being from the same lot of beans, and the hulling was done at virtually the same time. And, the discs on both machines had smooth surfaces. The most comparable test in Table 1 of Tennessee Bulletin No. 179 is Test No. 1.

Thus, as per Table III, in the case of the equipment claimed herein, when operating on beans with a 5.0% moisture content, the product contains 96.0% of clean, unbroken beans. The prior art equipment, when operating on beans having the same moisture content, produces 89.8% of clean, unbroken beans. The comparison becomes even more startling in the case of beans having an 18.0–18.5% moisture content, the equipment of this invention producing 81.4% of clean, unbroken beans, while that of the prior art yields only 20.1% of clean, unbroken beans. In view of the data of Tables II and III, and the fact that unhulled seed usually contains not more than about 10% of moisture, the present invention has the desirable effect of eliminating the need for the artificial drying of capsules prior to hulling.

Further, in connection with Table 1 of Tennessee Bulletin No. 179, it should be pointed out that Tests No. 2 through 9 introduce the variable of different types of surfaces (grooves, bars, etc.) of equal hardness, and are thus not comparable with the data presented herein, which are based on smooth surfaces of differential hardnesses. Also, it is important to note that hulling data are comparable only when obtained with hulling surfaces of the same diameter. Discs of different diameters give quite different paths (and, therefore, different types of rolling action and hulling) to the beans as they pass between the discs. The diameter of the discs for which data are presented in the Tennessee Bulletin is 6 inches, and, consequently, the data are not comparable to those presented herein for 24 inch discs. Another factor as to comparability of hulling data is that the data must be obtained on a given lot of, e. g. beans. The Tennessee bulletin aptly states that maturity and moisture content of the beans affect the hulling. In connection with obtaining data on the present invention, it was found that there was likely to be a noticeable change in huller performance when different lots of beans, having different maturities and moisture contents, were being processed. Such observations further strengthen the conclusion that data, such as are presented in Tennessee Bulletin No. 179, are not comparable with the data presented herein.

Other comments may be made which are pertinent to the huller described in the indicated Tennessee bulletins. Thus, spirals, grooves, and the like, which are indicated to give good results when present as a feature of hulling surfaces, have the characteristics of wearing down very fast, so that their effectiveness would be transient, and of being damaged easily by hard objects such as occasionally find their way into lots of unhulled seeds and nuts. The latter difficulty re hard objects can be overcome to some extent by the use of the spring-relief mechanism shown at Figure 3 of Tennessee Bulletin No. 187. As indicated above, a change in the hulling gap by as little as $\frac{1}{32}$ inch (ca. 0.03 inch) makes a great difference in the hulling results. Displacement of the hulling surface by hard objects is an obvious interference with the hulling gap and hulling results. But, a more serious effect on the hulling gap is caused when the feed rate is increased to give an acceptable hulling capacity; in this case, even with the strongest possible springs, the movable disc is readily displaced by ¼ inch, merely as a result of the increased feed rate, with untoward effects on the hulling results. These difficulties have been eliminated in the equipment of the present invention by omitting the spring-relief mechanism and by the use of a thick, soft rubber facing on one huller disc. Such a facing permits the passage of hard objects through the huller zone without appreciable damage to the huller facings.

In addition to the foregoing advantages of this invention, there is another advantageous factor which, like the foregoing factors, has commercial significance. This additional factor is the great increase in hulling capacity which results from the use of the differential hardness feature of this invention, as per Table IV.

TABLE IV

*Effect of variations in differential hardness and hulling gap on huller capacity*

| Rubber Hardness, Shore A | | Differential Hardness | Hulling Gap, Inches | Capacity, Lbs./Hr. |
|---|---|---|---|---|
| Stationary Disc | Rotating Disc | | | |
| 62 | 34 | 28 | .297 | 1,912 |
| 53 | 34 | 19 | .297 | 2,558 |
| 35 | 44 | 9 | .297 | 940 |
| 62 | 34 | 28 | .313 | 2,075 |
| 53 | 34 | 19 | .313 | 2,580 |
| 35 | 44 | 9 | .313 | 946 |
| 35 | 34 | 1 | .313 | 1,346 |
| 62 | 34 | 28 | .328 | 2,213 |
| 53 | 34 | 19 | .328 | 3,210 |
| 35 | 44 | 9 | .328 | 1,186 |
| 35 | 34 | 1 | .328 | 1,340 |
| 53 | 34 | 19 | .344 | 3,180 |
| 35 | 44 | 9 | .344 | 1,360 |
| 35 | 34 | 1 | .344 | 1,586 |

The huller used in obtaining the data presented in Table IV had hulling discs which were mounted horizontally; the hulling surfaces had a 14 inch inside diameter and an 18 inch outside diameter. The stationary disc was mounted as the upper disc, and castor beans were fed to the hulling zone through an opening in the center of the stationary disc.

These data were obtained when the rotating disc was operating at 500 R. P. M. This amounted to a peripheral speed of 2356 feet per minute.

It is of interest that approximately this peripheral speed (especially in the range from about 2300 to about 2400 feet per minute) has been found to be optimum for all disc diameters. An increase in speed beyond this point, although resulting in increased capacity, results in an undesirable increase in unhulled and broken beans.

For the U. S. 74 variety of castor beans, which was used in obtaining the data of Table IV, it appears that the hulling gap should fall in the .31–.33 inch range. With a gap of .313 inch, and a differential hardness of 19, the unhulled beans amounted to 1.40%, while the broken beans totalled 2.00% by weight of the beans charged to the huller. For a gap of .328 inch, the corresponding figures were 2.70% and 1.40%, respectively. As the size of the gap was decreased, the percentage of unhulled beans dropped, but the percentage of broken beans increased to an undesirable extent. Conversely, as the gap size was increased, the percentage of broken beans lessened, while the percentage of unhulled beans climbed beyond reasonable limits.

The feature of major interest in the data of Table IV is that the optimum capacity results when the differential hardness of the huller facings is in the preferred range stated above. Attention is directed in this connection to the data for a differential hardness of 19. For each hulling gap, all other factors than differential hardness being equal, the capacity at a differential hardness of 19 is much greater than the capacities for other differential hardness. For example, for the first three hulling gaps shown in Table IV, the capacity at a differential hardness of 19 is 2.7 times greater than that for a differential hardness of 9. The capacity also drops off to some extent as the differential hardness is increased beyond the preferred range, but remains at an acceptable figure.—Capacity was determined by actual measurement of the weight of beans drawn by gravity into the hulling zone from a storage space over a standard time period.

Thus, it can be seen that this invention offers the outstanding advantages of hulling of moist seeds and nuts without pre-drying, and of greatly increased capacity with minimum breakage and maximum hulling.

Figure 7:
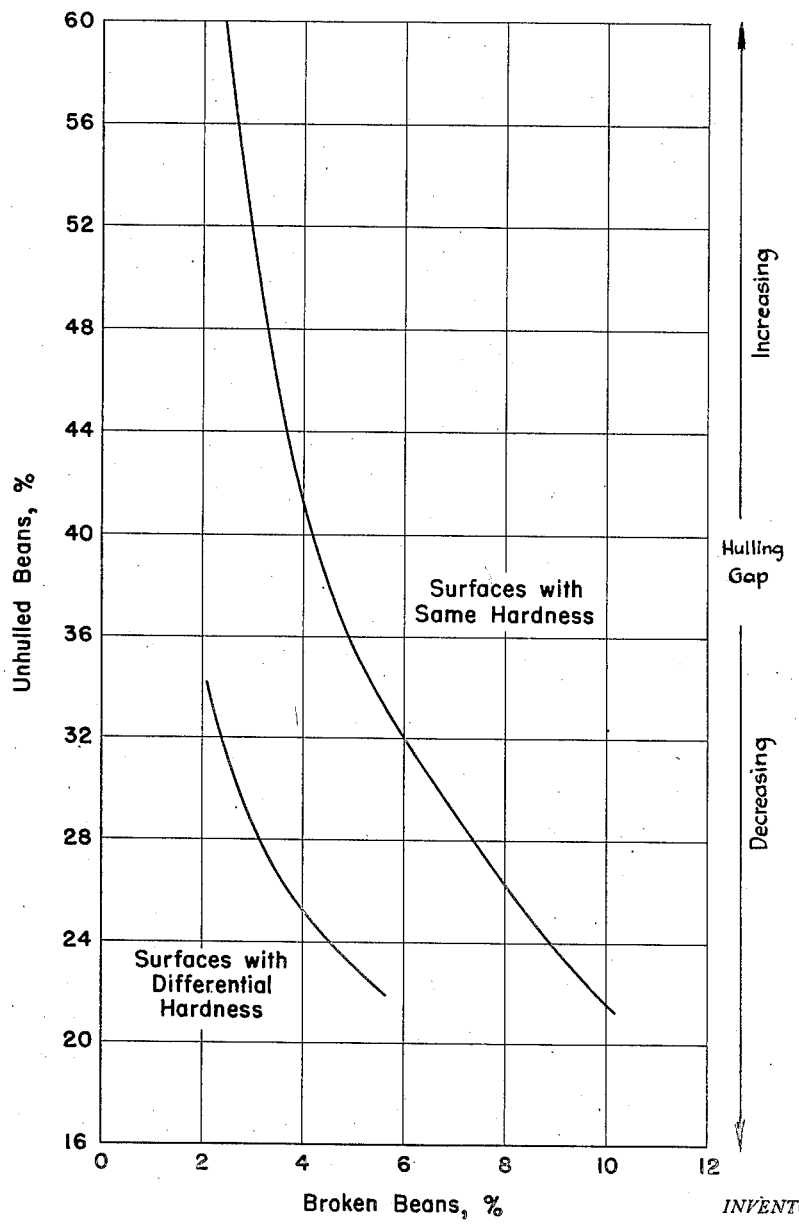

The data in Table V show the marked improvement achieved when the hulling surfaces of a cylindrical huller have different hardnesses within the claimed ranges. The huller used in these tests was a Belle City cylinder and concave huller, such as is referred to above as being described in two "Agricultural Engineering" articles. The data were obtained during the course of one day, and all of the beans hulled were from the same lot of castor beans (Cimmaron variety). The data represent results obtained with different hulling gaps, and show the relation between broken and unhulled beans as the hulling gap is decreased (the percentage of broken beans increasing as the hulling gap is narrowed). These data are also presented in the form of a graph (Figure 7).

A large percentage of unhulled beans is a normal operating characteristic of this type of huller. The usual mechanical arrangement for returning (or recycling) the unhulled beans to the cylinder and concave was not used in this series of tests.

It is of interest to note that, in the acceptable hulling range (less than 5% of broken beans), the hulling efficiency of the surfaces having a differential hardness was approximately twice as great as for surfaces of equal hardness. As per Figure 7, a similar relationship is seen to exist as to broken beans for a particular percentage of unhulled beans. For example, when the unhulled beans in the effluent from the cylindrical huller amounted to 24%, the broken beans obtained amounted to 4.5% with the differential hardness surfaces and 8.9% with surfaces of the same hardness. Similarly, for unhulled beans amounting to 28%, the corresponding figures for broken beans were 3.1% and 7.4%, respectively; while for unhulled beans amounting 32%, the corresponding figures for broken beans were 2.4% and 6.0%, respectively. Thus, Figure 7 gives a graphic indication of the pronounced improvement in hulling efficiency which results from the use of the claimed invention in a cylindrical huller.

TABLE V

*Effect of differential hardness in cylindrical huller*

| Rubber Hardness, Shore A | | Broken Beans, Percent | Unhulled Beans, Percent |
|---|---|---|---|
| Cylinder (corrugated surface) | Concave (smooth surface) | | |
| 55 | 35 | 2.1 | 34.1 |
| 55 | 35 | 3.2 | 25.1 |
| 55 | 35 | 5.8 | 22.4 |
| 55 | 55 | 2.4 | 60.4 |
| 55 | 55 | 3.6 | 45.0 |
| 55 | 55 | 5.2 | 34.0 |
| 55 | 55 | 6.8 | 30.0 |
| 55 | 55 | 10.2 | 21.2 |

Numerous modifications and variations in the invention described herein will be apparent to those skilled in the art and are within the spirit of the appended claims.

What is claimed is:

1. In a machine adapted for the decortication, hulling, shelling, and threshing of castor beans, peanuts, almonds, and similar seeds and nuts which comprises a feed inlet and two opposed rubber-faced discs, the improvement comprising two opposed rubber-faced discs, one of which is stationary and the other of which is rotatable, characterized by having the rubber facing on one disc of a substantially different hardness from the hardness of the rubber facing on the other disc, the Shore A hardness of the harder rubber facing being not greater than about 70, the Shore A hardness of the softer rubber facing being in the range from about 15 to about 45, and the difference between the Shore A hardnesses of the two rubber facings being not less than about 10, and the material constituting said facings being selected from the group consisting of natural and synthetic rubbers.

2. The device of claim 1, in which, when utilized for the hulling of castor beans, the width of the facing on said rubber-faced discs is from about 1.5 to about 6.0 inches.

3. The device of claim 1, in which one of said rubber facings has a Shore A hardness of from about 40 to about 60, and the other of said rubber facings has a Shore A hardness of from about 25 to about 40.

4. The device of claim 1, in which the difference between the Shore A hardnesses of said rubber facings is in the range from about 10 to about 20.

5. The device of claim 1, in which the distance between said rubber-faced discs is less than the average length of and greater than the average width of the hull-free beans.

6. The device of claim 1, in which the inner edge of a rubber facing is beveled, the beveled surface forming an angle of from about 20° to about 30° with the plane of said disc, and the distance between said rubber-faced discs at the point at which the beveled portion of said facing is thinnest being at least as great as the average length of the unhulled bean capsules, while the distance between the unbeveled portions of the surfaces of said rubber-faced discs is less than the average length of and greater than the average width of the hull-free beans.

7. The device of claim 1, in which said rotatable disc has a peripheral speed of about 2300 to about 2400 feet per minute.

8. In a machine adapted for the hulling of castor beans which comprises a feed inlet and two opposed rubber-faced discs, the improvement comprising two opposed rubber-faced discs, one of which is stationary and the other of which is rotatable, characterized by: (a) the rubber facing on one disc being of a substantially different hardness from the hardness of the rubber facing on the other disc, the Shore A hardness of the harder rubber facing being not greater than about 70, the Shore A hardness of the softer rubber facing being in the range from about 15 to about 45, and the difference between the Shore A hardnesses of the two rubber facings being not less than about 10, and the material constituting said facings being selected from the group consisting of natural and synthetic rubbers; (b) the width of the facing on said rubber-faced discs being from about 1.5 to about 6.0 inches; and (c) the distance between said rubber-faced discs being less than the average length of and greater than the average width of the hull-free beans.

9. In a machine adapted for the decortication, hulling, shelling, and threshing of castor beans, peanuts, almonds and similar seeds and nuts which comprises a feed inlet, two opposed rubber-faced surfaces, and means for moving one surface relative to the other surface, the improvement comprising two opposed substantially parallel, rubber-faced, material-contacting surfaces characterizzed by: (a) having the rubber facing on one surface of a substantially different hardness from the hardness of the rubber facing on the other surface, the Shore A hardness of the harder rubber facing being not greater than about 70, the Shore A hardness of the softer rubber facing being in the range from about 15 to about 45, and the difference between the Shore A hardnesses of the two rubber facings being not less than about 10, and the material constituting said facings being selected from the group consisting of natural and synthetic rubbers; (b) said parallel facings defining a hulling gap which extends for at least 1.5 inches in the direction of travel of said seeds and nuts; and (c) the distance between said facings being less than the average length of and greater than the average width of the hull-free seeds and nuts.

10. The device of claim 9, in which the effective speed of said relative surface movement is in the range from about 785 to about 2356 ft./min.

EDWARD FRANK HANSEN.

References Cited in the file of this patent

UNITED STATES PATENTS

| Number | Name | Date |
|---|---|---|
| 24,595 | Wagoner | June 28, 1859 |
| 652,919 | McHugh | July 3, 1900 |
| 684,088 | Newman | Oct. 8, 1901 |
| 785,206 | Farrar | Mar. 21, 1905 |
| 879,211 | Tebyrica et al. | Feb. 18, 1908 |
| 1,476,660 | Tucker | Dec. 4, 1923 |
| 1,489,695 | Burns et al. | Apr. 8, 1924 |
| 1,788,686 | Mott | Jan. 13, 1931 |
| 2,173,975 | Lyons | Sept. 26, 1939 |
| 2,195,754 | Robson et al. | Apr. 2, 1940 |
| 2,433,730 | Bridge | Dec. 30, 1947 |
| 2,477,160 | Arnold | July 26, 1949 |
| 2,535,485 | Cover | Dec. 26, 1950 |
| 2,610,634 | Beck et al. | Sept. 16, 1952 |

FOREIGN PATENTS

| Number | Country | Date |
|---|---|---|
| 593,638 | Great Britain | Oct. 22, 1947 |

OTHER REFERENCES

Bulletin No. 179, Agricultural Experiment Station, University of Tennessee, Knoxville, Tennessee, May 1942.

Bulletin No. 187, Agricultural Experiment Station, University of Tennessee, Knoxville, Tennessee, January 1944.